J. P. PEDERSEN.
HEADLIGHT OPERATING MECHANISM.
APPLICATION FILED DEC. 17, 1913.

1,139,068.

Patented May 11, 1915.

Inventor
Jens P. Pedersen.

Witnesses

By Victor J. Evans
Attorney

UNITED STATES PATENT OFFICE.

JENS PETER PEDERSEN, OF PROVO, UTAH.

HEADLIGHT-OPERATING MECHANISM.

1,139,068. Specification of Letters Patent. Patented May 11, 1915.

Application filed December 17, 1913. Serial No. 807,336.

*To all whom it may concern:*

Be it known that I, JENS PETER PEDERSEN, a citizen of the United States, residing at Provo, in the county of Utah and State of Utah, have invented new and useful Improvements in Headlight-Operating Mechanism, of which the following is a specification.

The invention relates to headlight operating devices, and more particularly to the class of automatically operated headlight turning mechanism for use on automobiles, vehicles, or the like.

The primary object of the invention is the provision of mechanism for controlling the headlights on an automobile or vehicle wherein on the turning of the front wheel of the vehicle the headlight will be moved to throw the light in the direction in which the vehicle is to travel, thereby assuring the projecting of the light in the course of travel of the vehicle.

Another object of the invention is the provision of mechanism wherein the head or pilot lights are directly controlled by the front turning wheels of the vehicle so that the said lights will be shifted to project the light therefrom in the course of travel of the machine, and thereby obviating the necessity of the manual turning of the head or pilot lights as is usual.

A further object of the invention is the provision of mechanism of this character wherein the head or pilot lights are mounted upon the vehicle in a novel manner so that on the turning of the front wheels of the vehicle the lights will be shifted simultaneously therewith, thus throwing the light in advance of the vehicle and in the course of its travel.

A still further object of the invention is the provision of mechanism of this character which obviates the necessity of any material alteration in the frame of the motor vehicle or the brackets for the pilot or headlights, thereby rendering the mechanism simple in construction, reliable and efficacious in its operation, and inexpensive in manufacture.

With these and other objects in view, the invention consists in the construction, combination and arrangement of parts as will be hereinafter fully described, illustrated in the accompanying drawing, and pointed out in the claim hereunto appended.

Figure 1:
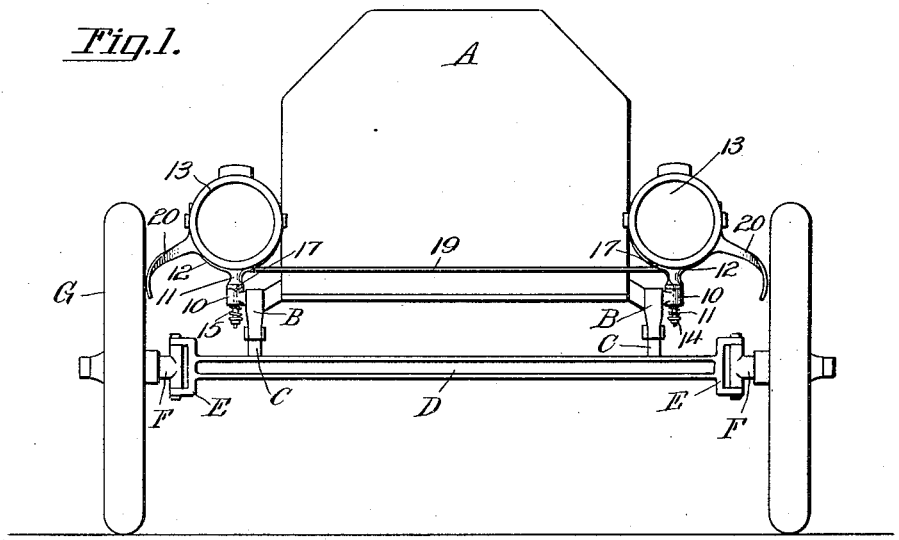
Figure 2:
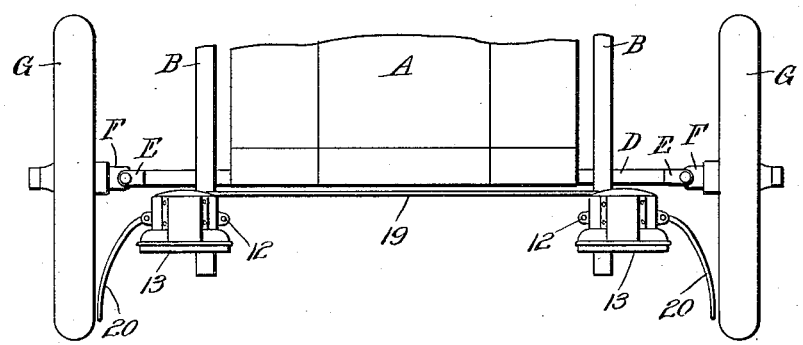
Figure 3:
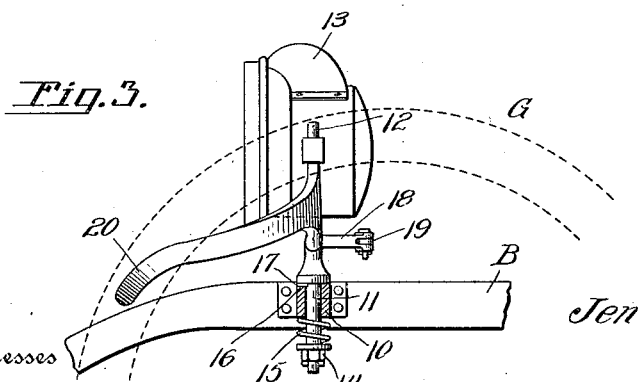

In the drawing:—Figure 1 is a front elevation of an automobile with the pilot lights and the mechanism for operating the same constructed in accordance with the invention. Fig. 2 is a fragmentary top plan view thereof. Fig. 3 is a fragmentary side view of the bearing for the pilot or head lamp showing the said bearing in section.

Referring to the drawing in detail, A designates a portion of the body of an automobile, B the side beams or bars of the supporting frame, C the front spring, D the axle, E the knuckles swingingly connecting the front spindles F supporting the front wheels G, which are of the ordinary well-known construction. Formed in the side beams B are bearings 10 in which are rotatably mounted the reduced stems 11 of the forked brackets 12 supporting the pilot or head lamps 13, which are of the usual well-known type.

Carried on the free end of each stem 11 of the lamp bracket 12 is an adjustable nut 14 which bears against one end of a coiled expansion spring 15 loosely surrounding the said stem 11 and having its opposite end resting against the bearing 10 which is formed with a notch 16 receiving a lug or nib 17 on the said bracket 12, the spring 15 being designed to hold the lug 17 in the notch 16 so as to prevent the accidental swinging of the lamp 13 from normal position so that the light will be projected therefrom in the straight line of travel of the vehicle.

Integrally formed with each bracket 12 is a rearwardly extending arm 18, and to these arms of the said brackets is pivotally connected a shifting bar or rod 19 which causes the lamps to swing in the same direction on the shifting of either of the said lamps under the direct action of the wheels of the vehicle in a manner presently described.

Formed on the outer limbs of the forks of the brackets 12 are outwardly and downwardly curved resilient arms 20, the free ends of which extend in close proximity to the inner sides of the tires of the wheels G so that on the turning of either of the said wheels the same will contact with the arm 20 adjacent thereto for the shifting of the lamps 13, which are adapted to rotate on the stems 11 in the bearings 10, thereby projecting the light from the said lamps 13 in the direct course of travel of the vehicle when the same is being steered in the ordinary well-known manner.

From the foregoing it is thought that the construction and manner of operation of the device will be clearly understood, and therefore a more extended explanation has been omitted.

What is claimed is:—

A headlight operating device for vehicles comprising a pair of sleeve-like bearings connected to the vehicle frame at the opposite sides of the body, forks each having a reduced stem rotatably fitted in the bearings, coöperating means formed on the stem and bearings for holding the lights in normal position, an outwardly and forwardly curved resilient arm integral with the outermost limb of each fork and adapted to extend in close proximity to the periphery of the wheel of the vehicle, a rearwardly directed extension medially of each fork, and a rod connected to the extensions of the forks for simultaneously turning the lights on turning of the wheels of the vehicle.

In testimony whereof I affix my signature in presence of two witnesses.

JENS PETER PEDERSEN.

Witnesses:
E. EDMONSTON, Jr.,
O. PAULCER.

Copies of this patent may be obtained for five cents each, by addressing the "Commissioner of Patents, Washington, D. C."